(12) United States Patent
Kendall et al.

(10) Patent No.: US 7,213,630 B2
(45) Date of Patent: May 8, 2007

(54) METHOD AND APPARATUS FOR PRODUCING AN RF CURED HOSE, AND THE HOSE SO PRODUCED

(75) Inventors: James Kendall, Trois-Rivières-Ouest (CA); Sylvain Chenard, St-Louis-de-France (CA); David Lord, Compton (CA); Eric St. Laurent, Sherbrooke (CA)

(73) Assignees: Hydro-Quebec LTEE, Shawinigan, Quebec (CA); Ansul Canada Ltd, Coaticook, Quebec (CA)

( * ) Notice: Subject to any disclaimer, the term of this patent is extended or adjusted under 35 U.S.C. 154(b) by 323 days.

(21) Appl. No.: 10/670,266

(22) Filed: Sep. 26, 2003

(65) Prior Publication Data

US 2005/0069664 A1 Mar. 31, 2005

(51) Int. Cl.
*D03D 3/02* (2006.01)
(52) U.S. Cl. .................. 156/393; 264/565; 264/563; 264/405; 425/393; 425/505
(58) Field of Classification Search ............... 156/393; 264/565, 563, 165, 496, 405; 425/393, 505
See application file for complete search history.

(56) References Cited

U.S. PATENT DOCUMENTS

| | | | |
|---|---|---|---|
| 4,495,970 A | 1/1985 | Pate et al. | 138/148 |
| 4,512,942 A * | 4/1985 | Babbin et al. | 264/474 |
| 4,519,759 A * | 5/1985 | Katz et al. | 425/97 |
| 4,559,095 A * | 12/1985 | Babbin | 156/244.13 |
| 5,557,969 A | 9/1996 | Jordan | 73/592 |

FOREIGN PATENT DOCUMENTS

| | | |
|---|---|---|
| CA | 1 140 845 | 2/1983 |
| CA | 0 157 956 | 10/1985 |
| CA | 2 323 774 | 9/1999 |
| CA | 2 337 220 | 1/2000 |

OTHER PUBLICATIONS

Radiowave frequency ranges. Online Document. Nov. 24, 1998. URL http://www.oulu.fi/~spaceweb/textbook/radiof.html.*

* cited by examiner

*Primary Examiner*—Richard Crispino
*Assistant Examiner*—Christopher T. Schatz
(74) *Attorney, Agent, or Firm*—Baker & Hostetler LLP

(57) ABSTRACT

An apparatus for making a hose including a weaving machine and a liner feeder for forming the hose by weaving a jacket about a liner as the liner is being fed into the weaving machine, where the liner is provided with an adhesive layer on an outer surface, the adhesive layer being doped with a radiation absorbing element. The apparatus includes a feeder for receiving and for flattening the hose and an oven located downstream from the feeder, including a bore through which the hose passes, the oven including a module for applying radiation to the hose so that the radiation absorbing element heats following the application of radiation for bonding the liner to the jacket. A winder is located downstream at a predetermined distance away from the oven for pulling and winding the hose and provided with a pressurizer for internally pressurizing a portion of the hose located between the winder and the feeder so that when the hose is in the oven, the pressurizer forces the liner against the jacket. A controller is provided for controlling the various elements of the apparatus. Also disclosed is a method for curing a hose and the hose so obtained.

3 Claims, 3 Drawing Sheets large number of pinholes in the resulting hose, which decreases its efficiency, and alters the properties of the polyester, reducing the lifetime of the hose. Furthermore, the conventional steam method prevents the production of hoses in continuous lengths.

METHOD AND APPARATUS FOR PRODUCING AN RF CURED HOSE, AND THE HOSE SO PRODUCED

FIELD OF THE INVENTION

The present invention relates to a method and apparatus for producing an RF cured hose, and is also directed to the hose itself.

DESCRIPTION OF THE PRIOR ART

Hoses are known in the art and exist for a variety of different purposes. Generally, hoses are constructed of a jacket, made of woven or non-woven material, and a liner inserted inside the jacket and bonded thereto.

In the conventional steam method of bonding the liner to the jacket, the polyester liner is exposed to a considerable amount of heat during the curing process. This creates a large number of pinholes in the resulting hose, which decreases its efficiency, and alters the properties of the polyester, reducing the lifetime of the hose. Furthermore, the conventional steam method prevents the production of hoses in continuous lengths.

There is thus a need for a process and apparatus for making a hose which reduces the occurrence of pinholes, and permits the production of the hose in continuous lengths.

SUMMARY OF THE INVENTION

It is an object of the invention to provide a method and apparatus for making a hose by selectively applying heat to the hose during the curing process. In accordance with the invention, this object is achieved with an apparatus for making a hose comprising:

a weaving machine and a liner feeder for forming said hose by weaving a jacket about said liner as said liner is being fed into said weaving machine, said liner being provided with an adhesive layer on an outer surface, said adhesive layer being doped with a radiation absorbing element;

a feeder for receiving and for flattening said hose;

an oven located downstream from said feeder, including a bore through which said hose passes, said oven including means for applying radiation to said hose so that said radiation absorbing element heats following the application of radiation for bonding said liner to said jacket;

a winder, located downstream a predetermined distance away from said oven for pulling and winding said hose, said winder being further provided with pressure means for internally pressurizing a portion of said hose located between said winder and said feeder, whereby when said hose is in said oven, said pressure means force said liner against said jacket; and a controller, for controlling said weaving machine, said liner feeder, said feeder, said oven and said winder.

In accordance with another aspect of the invention, this object is achieved with a method for curing a hose comprising:

(a) providing a woven jacket;
(b) inserting a liner provided with an adhesive layer on an outer surface thereof into said jacket to form a hose, said adhesive layer being doped with a radiation absorbing element;
(c) passing said hose through a feeder, said feeder pinching said hose between at least two rollers;
(d) pulling said hose with a winder, said winder including means for internally pressurizing said hose; and
(e) at a location between said feeder and said winder, passing said hose into an oven, said oven including means for applying radiation to said hose so that said radiation absorbing element heats following the application of radiation for bonding said liner to said jacket.

In a further aspect of the invention, this object is achieved with a hose comprising a woven jacket, a liner and an adhesive layer located between said jacket and said liner, said adhesive layer being doped with a radiation absorbing element.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1:
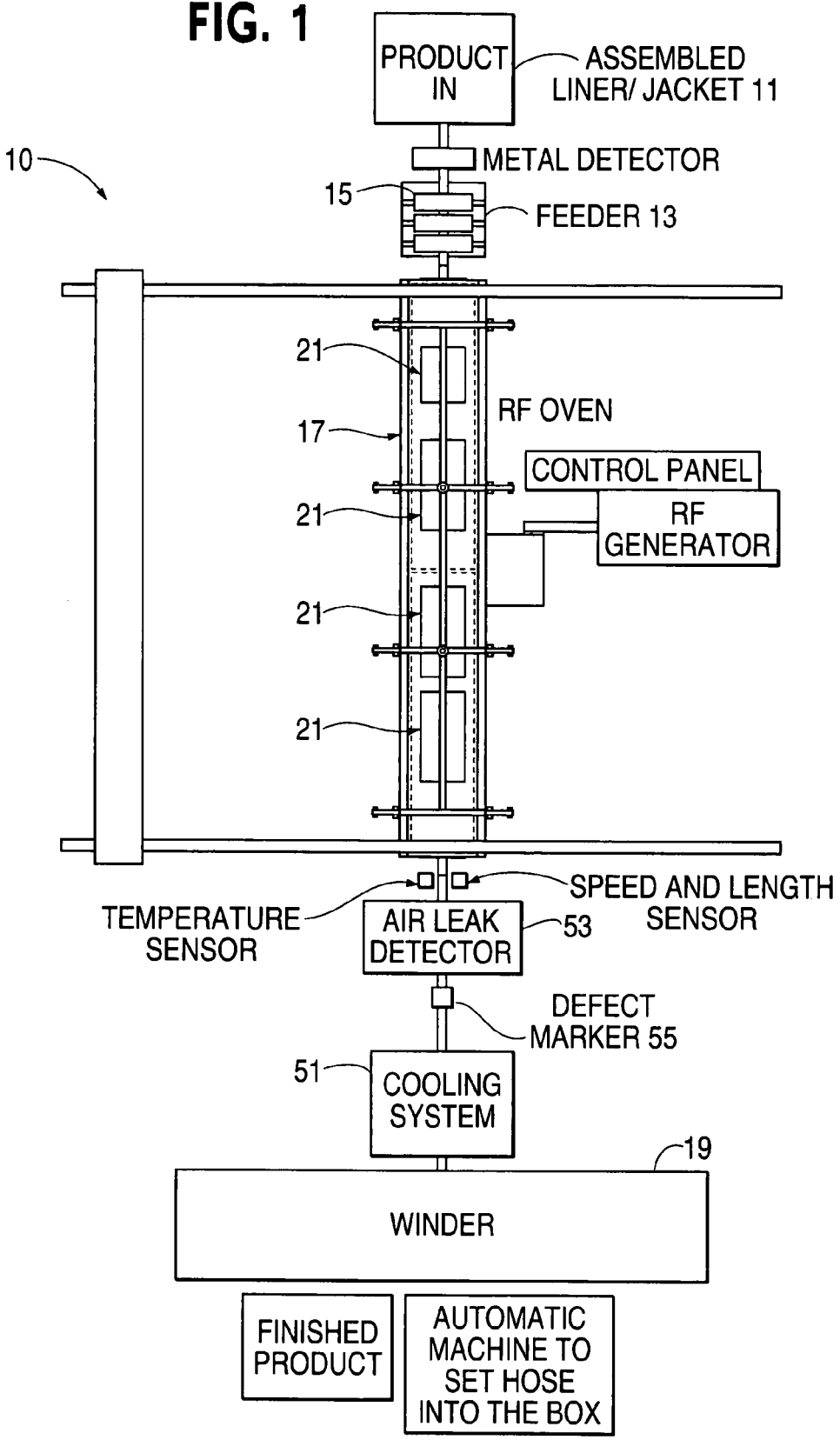
FIG. 1 is a schematic top view of an apparatus for making a hose according to a preferred embodiment of the invention.

Referring now to FIG. 1, there is shown an apparatus according to a preferred embodiment of the invention. The apparatus 10 includes a weaving machine 11 for weaving an outer jacket 101 on a liner 103. The liner is provided with an adhesive layer 105 on its outer surface, the adhesive layer being doped with a radiation absorbing element, the purpose of which will be explained hereinafter.

The woven hose is then passed through a feeder 13 including at least one pair of rolls 15 which pinch and flatten the hose and prevent air from passing beyond the feeder back into the weaving machine 11.

The hose is then passed through an oven 17 and then threaded onto a winder 19. The winder is equipped with means for pressurizing the inside of the hose, preferably a rotary air joint, such as those that are commercially available. The purpose of these means is to continually pressurize the hose between the winder 19 and the feeder 13 and thus force the liner against the jacket.

In the context of the present invention, the feeder controls the rate at which the apparatus runs, and the winder essentially takes up the slack under a predetermined tension.

Figure 2:
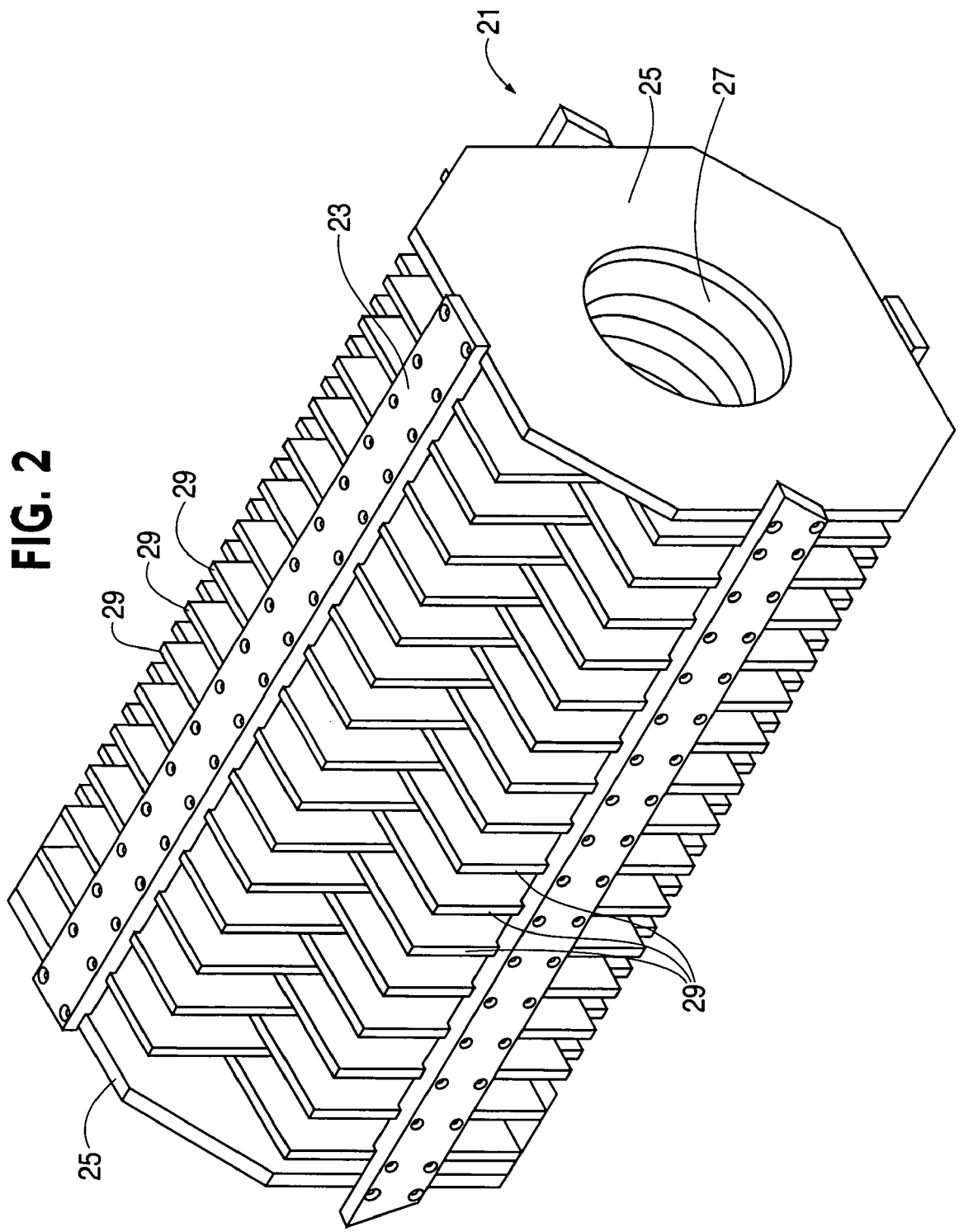
FIG. 2 is a perspective view of an applicator plate module according to a preferred embodiment of the invention.
Figure 3:
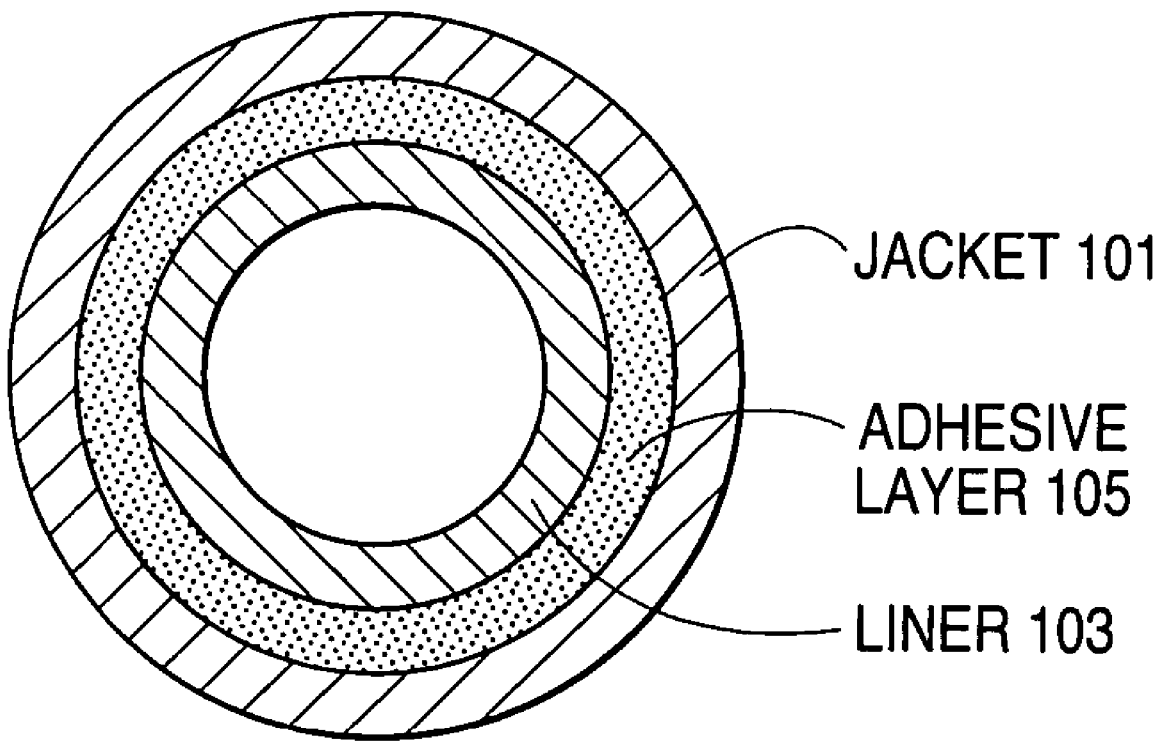
FIG. 3 is a cross-sectional view of a hose according to a preferred embodiment of the invention.

Once the hose is pressurized, the oven is started. The oven includes at least one applicator plate module 21, such as the one illustrated in FIG. 2. In a preferred embodiment of the invention, four such applicator plate modules are positioned within the oven. It will be appreciated that although the total length of the oven 17 remains constant for different hose diameters, the modules 21 can be configured according to the diameter. In a preferred embodiment, the total length of the oven 17 is approximately 234 inches, and each module has a length of approximately 41.5 inches.

The applicator plate module 21 includes an elongated frame 23 having two opposite ends 25 and a bore 27 coincident with said bore of said oven. A plurality of longitudinally spaced apart plates 29 lie in a plane perpendicular to an axis of the bore 27. The plates have applied thereto an alternating voltage at a predetermined frequency.

In a preferred embodiment, the voltages range from 0–4/5 kV, and the frequency is in the range of 1–14 MHz (i.e. RF).

It will be readily understood that the speed of the hose curing varies by hose diameter and the materials involved. For example, a 15 inch hose will cure at about 16 ft/min, whereas a 6-inch hose will cure at about 10 ft/min.

As mentioned previously, when the hose passes through the oven, the internal air pressure forces the liner against the jacket, and the heat generated by the electric field activates the radiation absorbing element of the adhesive layer of the liner. In a sense, the oven of the present invention acts in a way similar to a microwave oven, by heating only the radiation absorbing element which bonds the liner to the jacket, and not the whole hose, as in the prior art.

The adhesive layer is formed by co-extending a layer of adhesive grade resin that is compatible with the base tube resin. This could be any resin that provides adequate adhesion and can be simultaneously extended with the base tube. It must contain a substance such as silica carbon that will enable it to absorb RF radiation.

After exiting the oven, a predetermined length of open space allows the hose to cool before it is taken up by the winder or alternatively a cooling system 51 may be provided.

Once the winder is full, the winder is rolled out of the way, another winder is attached to the hose and the process continues.

In a further preferred embodiment of the invention, an ultrasonic leak detector 53, located between the oven and the winder, detects leaks in the hose. The leak detector 53 is composed of existing ultrasonic sensors, placed in a closed cell foam box through which the hose passes. Since very minute leaks can be detected, the hose can be marked by a defect marker 55 operatively associated with the detector 53 at the leak to remove it in subsequent -processing. This is advantageous since it avoids a hydrostatic testing step further down the manufacturing process.

The system is preferably controlled by a computer which monitors, displays and controls all of the system parameters. Once the parameters have been defined for a given hose, they only need to be called up and the system will automatically run under the appropriate conditions.

In a preferred embodiment of the invention, the weaving of the hose is done in lengths of 1000 feet or more, depending on the diameter of hose being produced.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. An apparatus for making a hose comprising:
a weaving machine and a liner feeder for forming said hose by weaving a jacket about said liner as said liner is being fed into said weaving machine, said liner being provided with an adhesive layer on an outer surface, said adhesive layer being doped with a radiation absorbing element;
a feeder for receiving and for flattening said hose;
an oven located downstream from said feeder, including a bore through which said hose passes, said oven including means for applying radiation to said hose so that said radiation absorbing element heats following the application of radiation for bonding said liner to said jacket, wherein said means for applying radiation comprise an at least one applicator plate module comprising an elongated frame having two opposite ends and a bore coincident with said bore of said oven; a plurality of longitudinally spaced apart plates lying in a plane perpendicular to an axis of said bore; said plates having applied thereto, in an alternating fashion, high and low voltages so that when said hose lasses inside said bore of said frame, said hose is subjected to alternating high and low voltages;
a winder, located downstream a predetermined distance away from said oven for pulling and winding said hose, said winder being further provided with pressure means for internally pressurizing a portion of said hose located between said winder and said feeder, whereby when said hose is in said oven, said pressure means force said liner against said jacket; and
a controller, for controlling said weaving machine, said liner feeder, said feeder, said oven and said winder.

2. An apparatus according to claim 1, wherein said apparatus further includes an ultrasonic leak detector, located between said oven and said winder.

3. An apparatus according to claim 1, wherein said apparatus includes four applicator plates.

* * * * *